United States Patent
Gallego

(10) Patent No.: US 11,563,690 B2
(45) Date of Patent: Jan. 24, 2023

(54) LOW LATENCY QUEUING SYSTEM

(71) Applicant: VECTORIZED, INC., San Francisco, CA (US)

(72) Inventor: Alexander Gallego, San Francisco, CA (US)

(73) Assignee: Redpanda Data, Inc., San Francisco, CA (US)

(*) Notice: Subject to any disclaimer, the term of this patent is extended or adjusted under 35 U.S.C. 154(b) by 181 days.

(21) Appl. No.: 16/997,243

(22) Filed: Aug. 19, 2020

(65) Prior Publication Data
US 2022/0060427 A1 Feb. 24, 2022

(51) Int. Cl.
| H04L 47/625 | (2022.01) |
| H04L 49/55 | (2022.01) |
| H04L 49/901 | (2022.01) |
| H04L 67/1095 | (2022.01) |
| H04L 67/1097 | (2022.01) |

(52) U.S. Cl.
CPC ........ *H04L 47/6255* (2013.01); *H04L 49/557* (2013.01); *H04L 49/901* (2013.01); *H04L 67/1095* (2013.01); *H04L 67/1097* (2013.01)

(58) Field of Classification Search
CPC .............. G06F 9/5005; G06F 9/546; H04L 47/6255; H04L 49/557; H04L 49/901; H04L 67/1095; H04L 67/1097
See application file for complete search history.

(56) References Cited

U.S. PATENT DOCUMENTS

| 7,783,786 | B1* | 8/2010 | Lauterbach | H04L 67/1095 709/239 |
| 10,642,957 | B1* | 5/2020 | Pinsonneault | G16H 20/10 |
| 10,676,318 | B2* | 6/2020 | Cortona | B66B 1/34 |
| 11,281,624 | B1* | 3/2022 | Paterra | G06F 16/13 |
| 11,354,177 | B2* | 6/2022 | Frolikov | G06F 13/1626 |

(Continued)

OTHER PUBLICATIONS

Kreps, J., et al., "Kafka: A Distributed Messaging System for Log Processing", http://pages.cs.wisc.edu/~akella/CS744/F17/838-CloudPapers/Kafka.pdf, Date Unknown, Downloaded Aug. 13, 2020 (7 pp).
Sax, Matthias J., "Apache Kafka", Springer International Publishing 2018, S. Sakr, A. Zomaya (eds.), Encyclopedia of Big Data Technologies, https://doi.org/10.1007/978-3-319-63962-8_196-1, Feb. 10, 2018 (8 pp).

(Continued)

*Primary Examiner* — Dung B Huynh
(74) *Attorney, Agent, or Firm* — Young Basile Hanlon & MacFarlane, P.C.

(57) ABSTRACT

Disclosed herein are methods and apparatuses for processing network traffic by a queuing system which may include: receiving pointers to chunks of memory allocated responsive to receipt of network traffic, the chunks of memory each including a portion of a queue batch, wherein the queue batch includes a plurality of queue requests; generating a data structure including the pointers and a reference count; assigning the queue request to a second core; generating a first structured message for the first queue request; and storing the first structured message in a structured message passing queue associated with the second core, wherein a second processing thread associated with the second core, responsive to receiving the structured message, processes the first queue request by retrieving the first queue request from at least one of the chunks of memory.

20 Claims, 10 Drawing Sheets

(56) References Cited

U.S. PATENT DOCUMENTS

| | | | | |
|---|---|---|---|---|
| 2012/0246206 | A1* | 9/2012 | Yamada | H04L 67/1097 707/827 |
| 2013/0145375 | A1* | 6/2013 | Kang | G06F 9/5083 718/104 |
| 2014/0351457 | A1* | 11/2014 | Baptist | H04L 69/22 710/5 |
| 2015/0378794 | A1* | 12/2015 | Sato | G06F 9/4812 719/328 |
| 2017/0075902 | A1* | 3/2017 | Hoffner | G06F 16/252 |
| 2017/0171302 | A1* | 6/2017 | Seo | H04L 67/1001 |
| 2018/0253331 | A1* | 9/2018 | Sato | G06F 9/546 |
| 2018/0300140 | A1* | 10/2018 | Maeda | G06F 13/1642 |
| 2019/0171895 | A1* | 6/2019 | Wang | G06F 9/4887 |
| 2020/0110634 | A1* | 4/2020 | Alvarez Martinez | G06F 9/5016 |
| 2020/0151001 | A1* | 5/2020 | Suzuki | G06F 9/48 |
| 2021/0076211 | A1* | 3/2021 | Lee | G06F 3/041 |
| 2021/0124712 | A1* | 4/2021 | Ley | G06F 3/167 |
| 2021/0136170 | A1* | 5/2021 | Katre | H04L 41/12 |
| 2021/0218615 | A1* | 7/2021 | Erez | H04L 67/56 |
| 2021/0294739 | A1* | 9/2021 | Oh | G06F 12/0246 |
| 2021/0382765 | A1* | 12/2021 | Venkatesh | G06F 9/5055 |
| 2022/0167365 | A1* | 5/2022 | Hu | H04W 72/121 |

OTHER PUBLICATIONS

Gallego, A., "Seastar: the future<>is here", https://www.alexgallego.org/concurrency/smf/2017/12/16/future.html, Dec. 16, 2017 (8 pp).

Das, A., et al., "SWIM: Scalable Weakly-consistent Infection-style Process Group Membership Protocol", http://www.cs.cornell.edu/info/projects/spinglass/public_pdfs/SWIM.pdf, Proceedings International Conference on Dependable Systems and Networks, Jun. 23, 2002 (10 pp).

Ongaro, D., et al., "In Search of an Understandable Consensus Algorithm (Extended Version)", https://raft.github.io/raft.pdf, May 20, 2014 (18 pp).

Github Pages, https://raft.github.io/, Date Unknown, Downloaded Aug. 13, 2020 (11 pp).

Li et al., Architecting to Achieve a Billion Requests Per Second Throughput on a Single Key-Value Store Server Platform, XP058512008, ISCA Jun. 13-17, 2015, Portland, OR, ACM 978-1-4503-3402-01/15/06, http://dx.doi.org/10.1145/2749469.32750416.

Anonymous, Apache Kafka, Sep. 27, 2015, XP055349143, Retrieved on Feb. 23, 2017 from http://web.archive.org/web/20150927133454/http://katka.apache.org/documentation.html.

\* cited by examiner

LOW LATENCY QUEUING SYSTEM

BACKGROUND

Queuing systems, such as Apache Kafka, can be utilized in various computerized systems to receive and process large volumes of data. Queues can be utilized in a variety of fields, such as content delivery networks, telecommunications, financial processing, messaging services, and other large-scale internet enabled applications. Some queuing systems permit data to be queued according to label (e.g., by topic) with the data associated with a label being organized in various partitions and/or segments across various computing and storage devices for later processing and storage.

SUMMARY

Disclosed herein are aspects of methods and apparatuses relating to queuing systems.

In an implementation, a method for processing queue requests by a queuing system having a plurality of computing devices is disclosed. Each computing device may have a plurality of cores, each core having an associated processing thread configured to receive queue requests. The method may include receiving a first queue request by a processing thread associated with a first core of a first computing device of the plurality of computing devices, wherein receiving the first queue request includes generating a data structure for storing the first queue request, where the data structure references memory chunks generated by an electronic communication unit, determining an assignment of the first queue request to a second core of the first computing device based on a comparison between an identifier associated with the first queue request in the data structure and a partition routing table stored in a memory location associated with the first core, routing the first queue request to the second core by generating a first structured message that includes a pointer referencing memory associated with the data structure that stores the first queue request and storing the first structured message in a structured message passing queue for the second core, wherein the second core processes the first queue request stored in the data structure responsive to reading the structured message, and deallocating the data structure responsive to an indication that processing of data stored in the data structure has been completed.

In an implementation, a method for processing network traffic by a queuing system having a plurality of computing devices is disclosed. Each computing device may have a plurality of cores, each core having an associated processing thread configured to receive network traffic. The method may include receiving, by a first processing thread associated with a first core of the plurality of cores of a first computing device of the plurality of computing devices, pointers to chunks of memory allocated responsive to receipt of network traffic by an electronic communications unit, the chunks of memory each including a portion of a queue batch transmitted to the first computing device, wherein the queue batch includes a plurality of queue requests, generating a data structure including the pointers and a reference count, determining, for a first queue request of the plurality of queue requests, a processing assignment to a second core of the plurality of cores of the first computing device, generating a first structured message for the first queue request, and storing the first structured message in a structured message passing queue associated with the second core, wherein a second processing thread associated with the second core, responsive to receiving the structured message, processes the first queue request by retrieving the first queue request from at least one of the chunks of memory.

In an implementation, an apparatus is disclosed that includes a memory and a processor having a first core and a second core. The first core is configured to execute instructions stored in the memory to receive pointers to chunks of memory allocated in the memory responsive to a receipt of network traffic by an electronic communications unit, the chunks of memory each including a portion of a queue batch transmitted to the electronic communications unit, wherein the queue batch includes a plurality of queue requests, generate a data structure including the pointers and a reference count, determine, for a first queue request of the plurality of queue requests, a processing assignment to the second core, generate a first structured message for the first queue request, and store the first structured message in a structured message passing queue in the memory, wherein the second core, responsive to reading the first structured message, processes the first queue request by retrieving the first queue request from at least one of the chunks of memory.

These and other implementations of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

DETAILED DESCRIPTION

Figure 1:
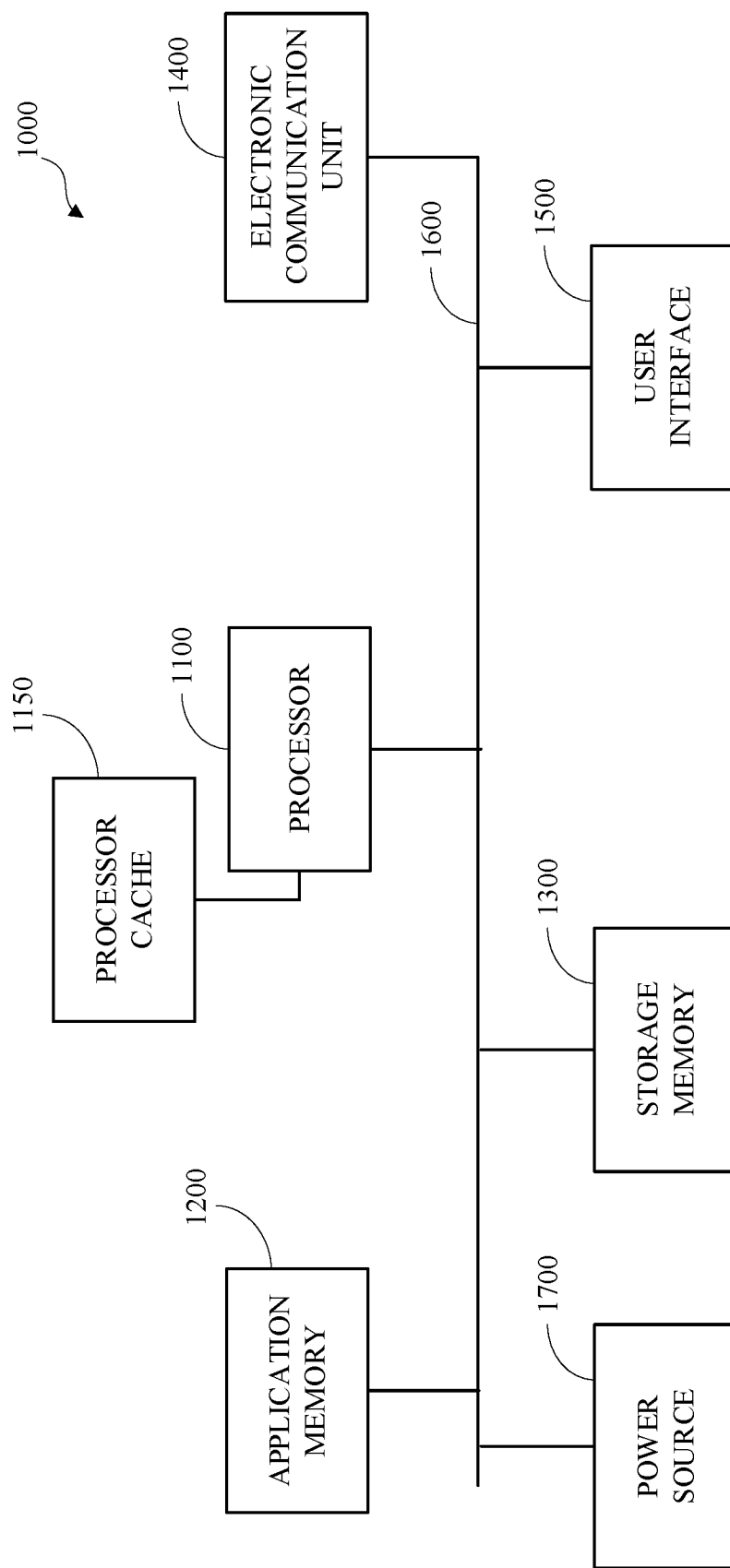
FIG. 1 is a block diagram of an example of a computing device.

Queuing systems are generally designed to permit the queuing of large amounts of data for later processing in order to decouple the production of data from the consumption of data. In general, the heart of a queuing system is one or more queues, where data is consumed in the order in which it is received. An example queue is described in more detail with respect to FIG. 4. An example use case for a queuing system is described in more detail with respect to FIG. 5. A notable feature of queuing systems is the availability of the queuing system in order to prevent the loss of data which may be produced at substantial rates and may be lost if not captured by the queueing system.

Existing queuing systems suffer from a number of operational deficiencies. One such deficiency is that existing queuing systems were not designed for use with computing systems with a very large number of processing cores, e.g., 32, 128, or greater number of cores, and higher system latency between processing cores and memory. Accordingly, existing queuing systems may have unnecessary latency built into their designs caused by, for example, processing threads being switched between and executed on different cores, and memory locks causing delays in memory access due to a memory location being locked for all cores when a single core accesses the memory location, forcing other cores to wait to access that memory location. In addition, existing queuing systems allocate continuous memory areas for queue batches received from clients which doubles the required memory, as part of a process which may be referred to as linearization (e.g., in addition to the memory allocated when network packets are received). An example of linearization of received data is described further with respect to FIG. 6. Existing queuing systems also may not utilize a mathematically proven fault tolerant protocol. Accordingly, existing queuing systems may require more computing resources, may not be fault-tolerant (e.g., it may be possible to know with certainty that data has been lost), and may suffer from throughput and latency bottlenecks.

Implementations of the queuing systems described in this disclosure improve upon the deficiencies found in existing queuing systems. As a result of the improvements described in this disclosure, it is possible to implement queuing systems that are faster (e.g., 10×, or more, faster than Apache Kafka), easier to operate and run, and fault tolerant. Implementations of this disclosure may utilize a "reactor pattern" whereby there is one execution thread per processing core. That execution thread may be "pinned" to a single core—e.g., it is not allowed to be executed by any other core. One technical problem with this "reactor pattern" is that data may be received using one core but needs to be processed by an execution thread pinned to a different core. Thus, a mechanism is needed to reduce the processing bandwidth, memory usage, and latency of communicating between cores.

Implementations of the queuing systems described in this disclosure utilize a data structure referred to as "iobuf" in order to achieve zero-copy data handling of received data. Typically, a queuing system will receive a number of queue requests in a so-called queue batch. This queue batch may be received by an electronic communication unit (e.g., network interface) over time as packets that include portions of the queue batch are received. The packets may be of different sizes and may be received out of order. The electronic communications unit may allocate memory as packets are received which may not be contiguous or in order according to the structure of the originally transmitted queue batch. The core receiving the data allocates an iobuf data structure including control fields (e.g., size, number of memory chunks, etc.), pointers to the memory chunks allocated by a network interface driver that received, and reference counters indicating the number of times that a memory chunk has been shared with another core to enable the memory chunk to be deallocated when the memory chunk is no longer being used. References to the "iobuf" data structure may be shared between cores using structured message passing queues, wherein each core can be configured to have a separate queue for each other core to which a structured message may be sent.

Implementations of the disclosure that utilize an "iobuf" data structure benefit from reduced memory usage, reduced latency, and reduced processing time. For example, with an "iobuf" data structure, memory copying can be avoided or reduced. Each core is able to access data received by a different core using structured messaging, and reference counting permits tracking the sharing of data in order to permit memory deallocation when data has been processed. While using such an "iobuf" structure may increase processor usage, the benefit of such increased usage may outweigh the latency otherwise caused by increased memory copying, locking, and allocation, and also may be outweighed by the relatively lower cost of processor cycles on a multi-core basis that are now available in the marketplace as compared to costs for memory that is available on a local basis to such processor cores. The described implementations may also better scale to computing devices that have relatively high numbers of cores (e.g., 64, 128, 144, or more) in which cases memory locks increasingly become a less practicable way of controlling access to memory locations, because such locks can operate to block the execution of all cores in favor of the one processor core holding such a lock. An "iobuf" data structure and the other aspects of queueing systems disclosed herein may also permit queueing systems to operate at higher saturation—e.g., utilize a greater percentage of processor and memory resources, which may decrease the quantity of hardware required (and eliminate the costs associated with the hardware no longer needed).

In addition to the use of the "iobuf" data structure, implementations of the queuing systems described in this disclosure utilize a mathematically proven fault tolerant protocol, such as raft. Raft is further described in "In Search of an Understandable Consensus Algorithm (Extended Version)" by Ongaro and Ousterhout, available at https://raft.github.io/raft.pdf. For example, implementations of this disclosure may utilize a so-called management raft group (also referred to as "raft0") to which all computing devices are a member (and in certain implementations, all cores of all computing devices). The management raft group can be used to identify which computing devices and/or cores are designated to process which queue requests in a queuing system.

For example, a queue request can be composed of a key/value pair that is to be placed in a queue. A queue request can be associated with a topic, which can be identified using an arbitrary string. A topic can be assigned to one of many partitions using a hashing algorithm (e.g., which may be executed client-side and the partition assignment may be incorporated into the queue request). The number of partitions can vary depending on the volume of queue requests expected for a given topic and the computing and memory capacity of the computing devices. Each partition can be configured with its own raft group to manage the fault tolerance of the queue requests received for that partition. For example, the raft group for a partition including three computing devices can establish a leader which will process queue requests and two followers to which the data associated with processed queue requests will be replicated from the leader. In this way, using the raft protocol, the data associated within individual partitions can be processed and stored in a fault tolerant manner and the overall administrative information regarding the computing device membership for all partitions can be managed in a fault tolerant manner and also be available on each computing device and core.

FIG. 1 is a block diagram of an example of a computing device 1000. One or more aspects of this disclosure, such as the client and server devices shown in FIG. 2 may be implemented using the computing device 1000. The computing device 1000 includes a processor 1100, processor cache 1150, application memory 1200, storage memory 1300, an electronic communication unit 1400, a user interface 1500, a bus 1600, and a power source 1700. Although shown as a single unit, one or more elements of the computing device 1000 may be integrated into a number of physical or logical units. For example, the processor cache 1150 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may be connected to the processor cache 1150 for internal storage of operating data or instructions. For example, each core within processor 1100 may have a separate processor cache 1150 unit or may have specified memory locations allocated to it within processor cache 1150. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the processor cache 1150, application memory 1200, the storage memory 1300, the electronic communication unit 1400, the user interface 1500, the bus 1600, the power source 1700, or any combination thereof. The processor may execute, which may include controlling, which may include sending to and/or receiving electronic signals from, the application memory 1200, the storage memory 1300, the electronic communication unit 1400, the user interface 1500, the bus 1600, the power source 1700, or any combination thereof. Execution may be facilitated by instructions, programs, code, applications, or the like, which may include executing one or more aspects of an operating system, and which may include executing one or more instructions to perform one or more aspects described herein, alone or in combination with one or more other processors.

The application memory 1200 is coupled to the processor 1100 via the bus 1600 and may include any storage medium with application data access including, for example, DRAM modules such as DDR SDRAM, Phase-Change Memory (PCM), flash memory, or a solid-state drive. Although shown as a single block in FIG. 1, the application memory 1200 may be implemented as multiple logical or physical units. Other configurations may be used. For example, application memory 1200, or a portion thereof, and processor 1100 may be combined, such as by using a system on a chip design.

The application memory 1200 may store executable instructions or data, such as application data for application access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The storage memory 1300 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the storage memory 1300 may be implemented as multiple logical or physical units.

The storage memory 1300 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE) or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500 may be part of another computing device (not shown), such as in addition to or instead of being part of the computing device 1000. In some implementations, the user interface 1500 may be omitted or implemented virtually using remote access technologies via the electronic communication unit 1400.

The bus 1600 is coupled to the application memory 1200, the storage memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
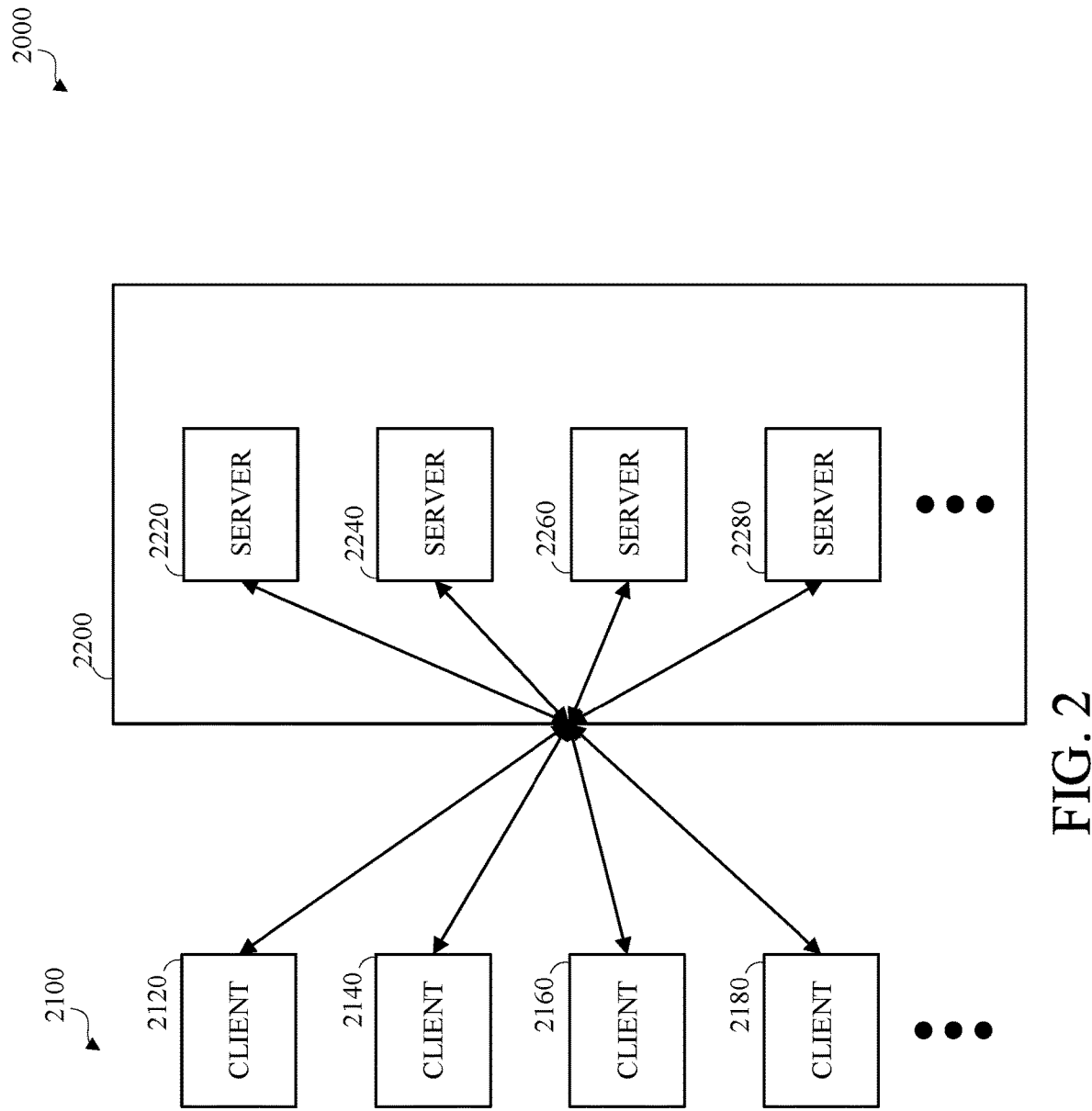
FIG. 2 is a block diagram of an example arrangement of computing devices used in a queuing system.

FIG. 2 is a block diagram of an example arrangement 2000 of computing devices used in a queuing system 2200. The computing devices can include a number of client devices 2100 and a number of server devices that comprise the queuing system 2200. As shown, there are four client devices 2120, 2140, 2160, and 2180 and four server devices 2220, 2240, 2260, and 2280. However, the number of client devices and server devices may vary depending on implementation. As described previously, the server devices 2220, 2240, 2260, and 2280 may implement a fault tolerant protocol that is mathematically proven, such as raft. Accordingly, queue batches and queue requests transmitted to the queuing system from one or more client devices may be routed or allocated to any one of the server devices 2220, 2240, 2260, and 2280 in a manner consistent with the raft protocol.

For example, queue batches or queue requests may be allocated randomly among the server devices 2220, 2240, 2260, and 2280 and if a queue request is not designated to be processed by the randomly assigned server device, such as the server device 2240, that server device may send a response message indicating which server device is designated to process that queue request, such as server device 2280. Alternatively, the server device 2240 may forward the message to the correct the server device 2280.

Figure 3:
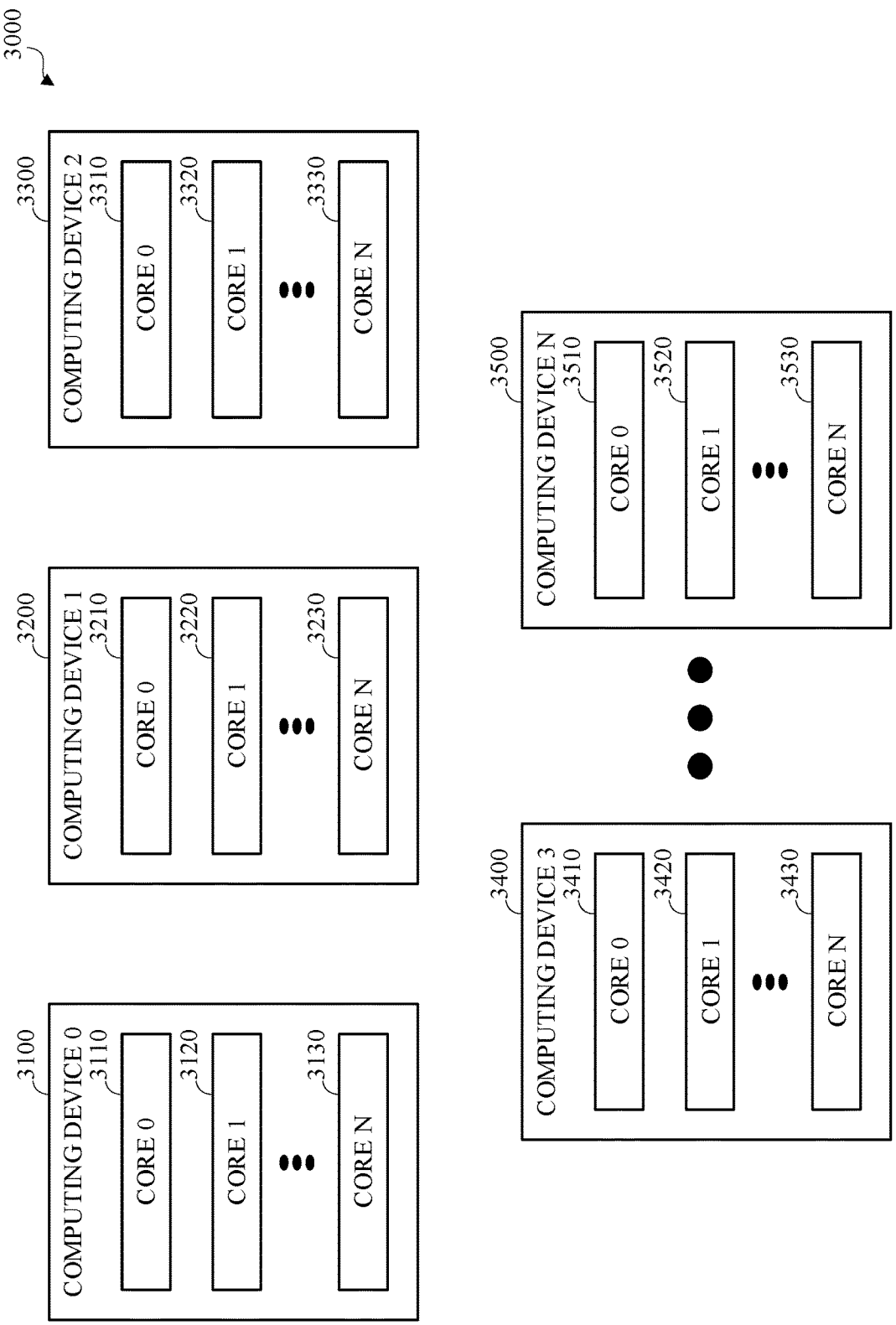
FIG. 3 is a block diagram of an example of a queuing system.

FIG. 3 is a block diagram of an example of a queuing system 3000. Queuing system 3000 includes computing devices 3100, 3200, 3300, 3400, 3500. As illustrated, queuing system 3000 includes 5 computing devices, however, implementations of this disclosure may have additional or fewer computing devices, for example, depending on the volume of queue requests, the capabilities of the computing devices, and the desired load factor of the computing devices. For example, the value of "N" could be 10 computing devices.

Each computing device 3100, 3200, 3300, 3400, 3500 may have a number of processing cores. For example, as shown, each computing device has three cores: 0, 1, and N—3110, 3120, 3130 for computing device 0; 3100, 3210, 3220, 3230 for computing device 1 3200; 3310, 3320, 3330 for computing device 2 3300; 3410, 3420, 3430 for computing device 3 3400; and 3510, 3520, 3530 for computing device N 3500.

As previously explained, the computing devices in queuing systems implemented according to this disclosure can utilize a mathematically proven fault tolerant protocol, such as raft. In the example of FIG. 3, the management raft group or raft0 group can include all of the computing devices in the queuing system. Other raft groups for various partitions of topics processed by the queuing system can encompass varying numbers and members of computing devices which may be selected differently for various implementations. For example, a first raft group for a first partition of a first topic could encompass computing devices 0 3100, 1 3200, and 2 3300. For example, a second raft group for a second partition of a first topic could encompass computing devices 0 3100, 3 3400, and N 3500. Other raft groups could have the same or different members as these examples.

Figure 4:
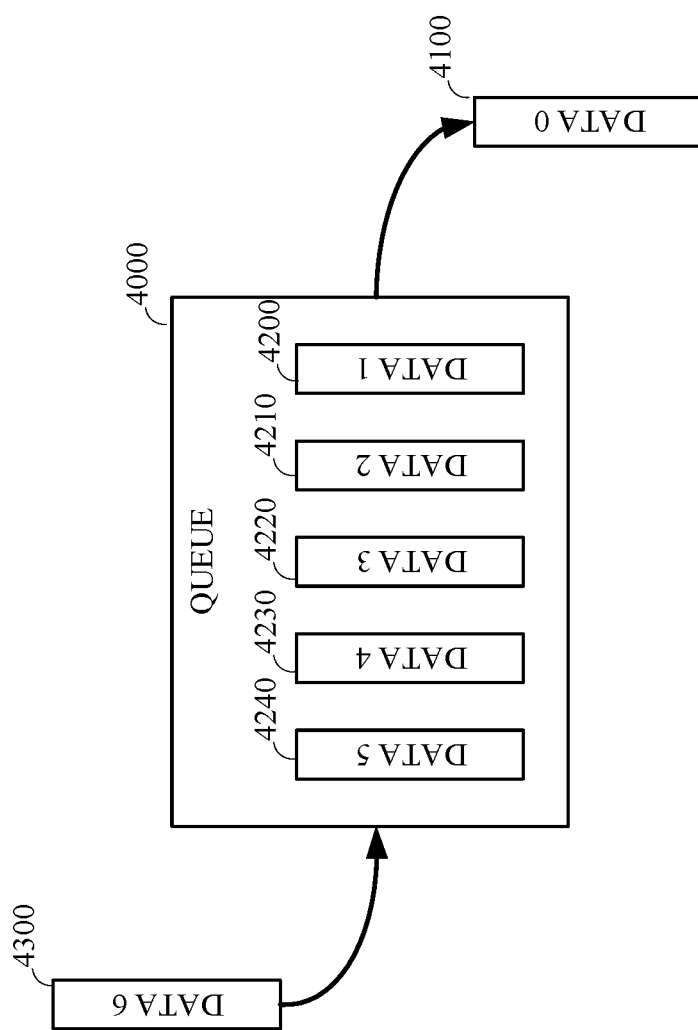
FIG. 4 is a block diagram illustrating an example of the operation of a queue.

FIG. 4 is a block diagram illustrating an example of the operation of a queue 4000. A queue is characterized by the property that data is consumed in the order in which it is received. For example, in the example shown, data 0 4100 is being consumed from the queue, the queue includes additional data elements data 1 4200, data 2 4210, data 3 4220, data 4 4230, and data 5 4240, in that order, and data 6 4300 is in the process of being added to the queue. In this example, the data elements were both received by the queue and will be consumed in the order data 0 4100, data 1 4200, data 2 4210, data 3 4220, data 4 4230, data 5 4240, and data 6 4300.

Depending on the implementation, the queue 4000 may persist data elements for a particular period of time or for an indefinite time and may retain or discard data elements when they are consumed. If data elements are not discarded once consumed, they may be retained in storage, such as in the form of a log of key/value pairs, for later retrieval and consumption.

Figure 5:
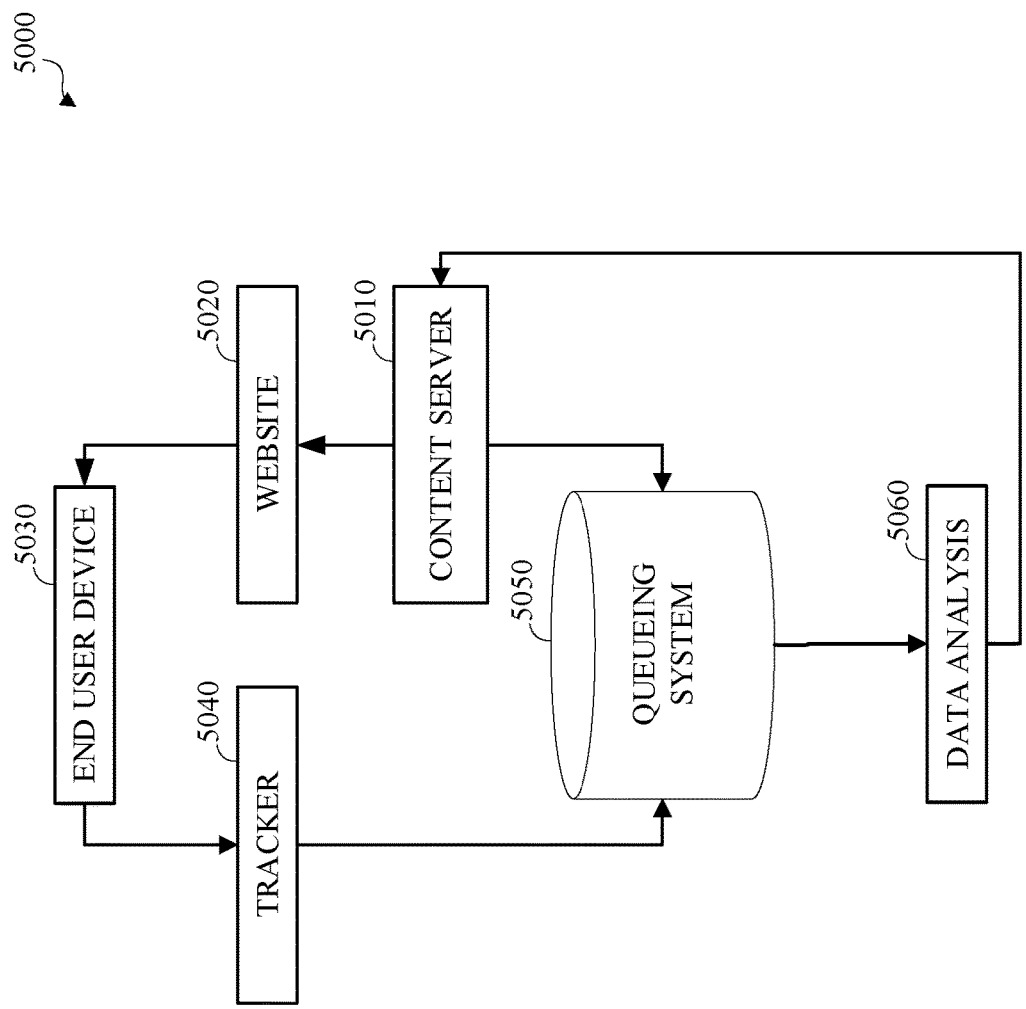
FIG. 5 is a block diagram illustrating an example of a content and analysis system utilizing a queue.

FIG. 5 is a block diagram illustrating an example of a content and analysis system 5000 utilizing a queue. The system 5000 includes a content server 5010 that provides content to a website 5020 for transmission and display by an end user device 5030. In some implementations, the content provided by the content server 5010 may be advertisements or other paid content. The content server 5010 is also configured to transmit to a queuing system 5050 information detailing the number of impressions, e.g., the number of times each piece of content is displayed to an end user device, such as the end user device 5030. For example, the information transmitted to the queuing system 5050 may include queue requests including key value pairs indicating the piece of content displayed and the end user to which it was displayed.

The system 5000 may also include a tracker 5040 which collects information about the interaction with the content on the end user device 5030. For example, the tracker 5040 may be configured to collect information when the content is clicked on. The tracker 5040 may be configured to send some or all of the collected information to the queuing system 5050. For example, the tracker 5040 may transmit to the queuing system 5050 queue requests including key value pairs indicating the pieces of content clicked on and the end users that clicked on the content.

The information queued in the queuing system 5050 may be consumed by a data analysis unit 5060. For example, the data analysis unit 5060 may be configured to analyze impressions and clicks over time to determine which content performs better with users and to adjust the content being provided by the content server 5010. In this use case, the queuing system 5050 serves to decouple data collection from data processing which may enable the processing of data collected over a longer time period and also may permit data to be collected at higher or irregular volumes than the consumer may be otherwise unable to effectively process.

The system 5000 as shown depicts only one example of a system in which a queuing system may be used. Many other use cases are possible. For example, a queuing system may be utilized in many systems in which it is desirable to decouple data collection and processing.

Figure 6:
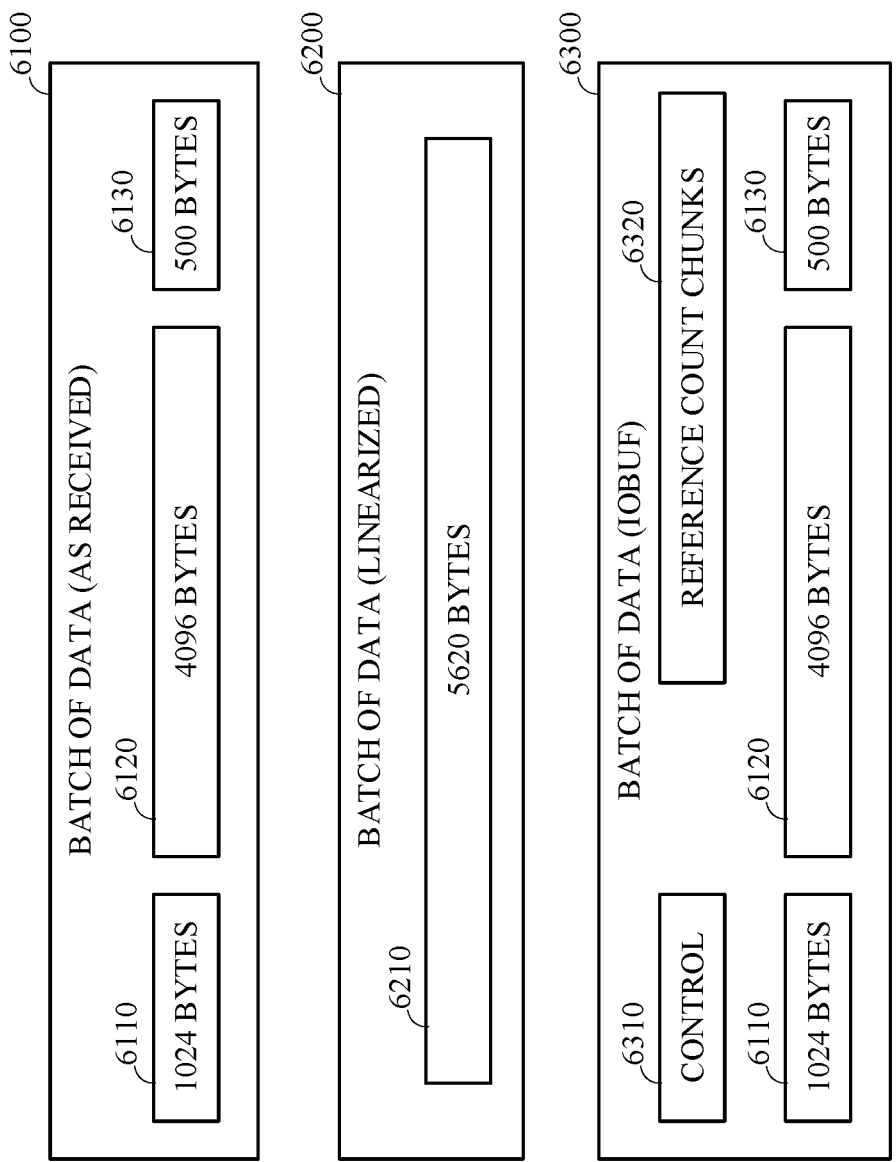
FIG. 6 is a block diagram of examples of arrangements of a batch of data.

FIG. 6 is a block diagram of examples of arrangements of a batch of data. The batch of data may, for example, be a queue batch. A batch of data 6100 depicts the batch of data as it is received by an electronic communication unit. An electronic communication unit, for example, may receive packets of data from a network and may receive the batch of data separated into multiple packets and/or out of order. Accordingly, the electronic communication unit may separately allocate memory for the separate pieces of data of the batch of data as it is received. As depicted in the batch of data 6100, there are three separate pieces of data received for the batch of data. These pieces are each allocated separate chunks of memory 6110, 6120, and 6130 by the electronic communication unit which may not be contiguous or in order. Accordingly, what may be received by the queuing system from the electronic communications unit are, for example, three pointers to the memory locations of the three chunks of memory holding the data associated with the batch of data. Depending on the network over which the data is received, the sizes of the various chunks of memory may vary. As shown, the chunks of memory 6110, 6120, and 6130 have sizes of 1024 bytes, 4096 bytes, and 500 bytes, respectively.

Existing queueing systems may, before processing a received batch of data, linearize the received batch of data, such as shown in a batch of data 6200, such that the batch of data is copied into a contiguous space of memory, for example, a memory 6210. Linearizing a batch of data requires the allocation of additional memory space and requires locating a suitable segment of memory that is contiguous. Linearization requires additional time to allocate and copy the memory. The benefit of linearization is that the resulting data structure is somewhat easier to utilize.

An alternative means of utilizing a received batch of data, as is used by implementations of queuing systems consistent with this disclosure, is demonstrated by a batch of data 6300 also referred to herein as an "iobuf" data structure. An "iobuf" data structure 6300 includes control information 6310, reference count chunks 6320, and pointers to memory chunks comprising the received batch of data as allocated in memory by the electronic communications unit—such as in the chunks of memory 6110, 6120, and 6130. The control information 6310 may include variables storing metadata about the "iobuf" data structure such as size, begin pointer, end pointer, number of chunks, etcetera, as may be needed to effectively utilize the "iobuf" data structure in a particular implementation.

In implementations of this disclosure, with reference to the reference count chunks 6320, a reference count chunk data structure is created for each chunk of memory that is a part of the "iobuf" data structure 6300. For example, a reference count data structure can include a size variable indicating the size of the underlying memory chunk (e.g., 1024 bytes for the memory chunk 6110), a reference count variable indicating the number of messages awaiting processing that refer to the chunk of memory, and a pointer to the underlying memory chunk.

A reference count mechanism is utilized at least in part because, for a given queue batch, there may be multiple queue requests that may be processed by multiple cores. For example, a chunk of memory may store multiple queue requests (or portions thereof) and a queue request may be stored across more than one chunk of memory. When, for example, a queue request is assigned to another core for processing, a reference count for the memory chunk(s) storing that queue request is incremented. This may occur multiple times for given chunk(s) of memory and thus, their respective reference counts may be incremented to a number greater than one. The other cores assigned to process the queue request(s) are provided with a pointer to the "iobuf" data structure and/or identifying information to enable the other cores to access the memory chunk(s) that store the queue request(s) to be processed by the other cores.

Once a queue request is processed by the other core(s), a message is provided by the other core(s) back to the core that generated the iobuf data structure indicating that the queue request has been processed. In response, the reference count for the associated memory chunk(s) is decremented. Once the reference count for a memory chunk reaches zero, the memory chunk may be deallocated. This mechanism enables the management and deallocation of memory while avoiding the allocation, copying, and locking of memory where a queue request is stored in memory allocated to one core and processed by one or more other cores.

Figure 7:
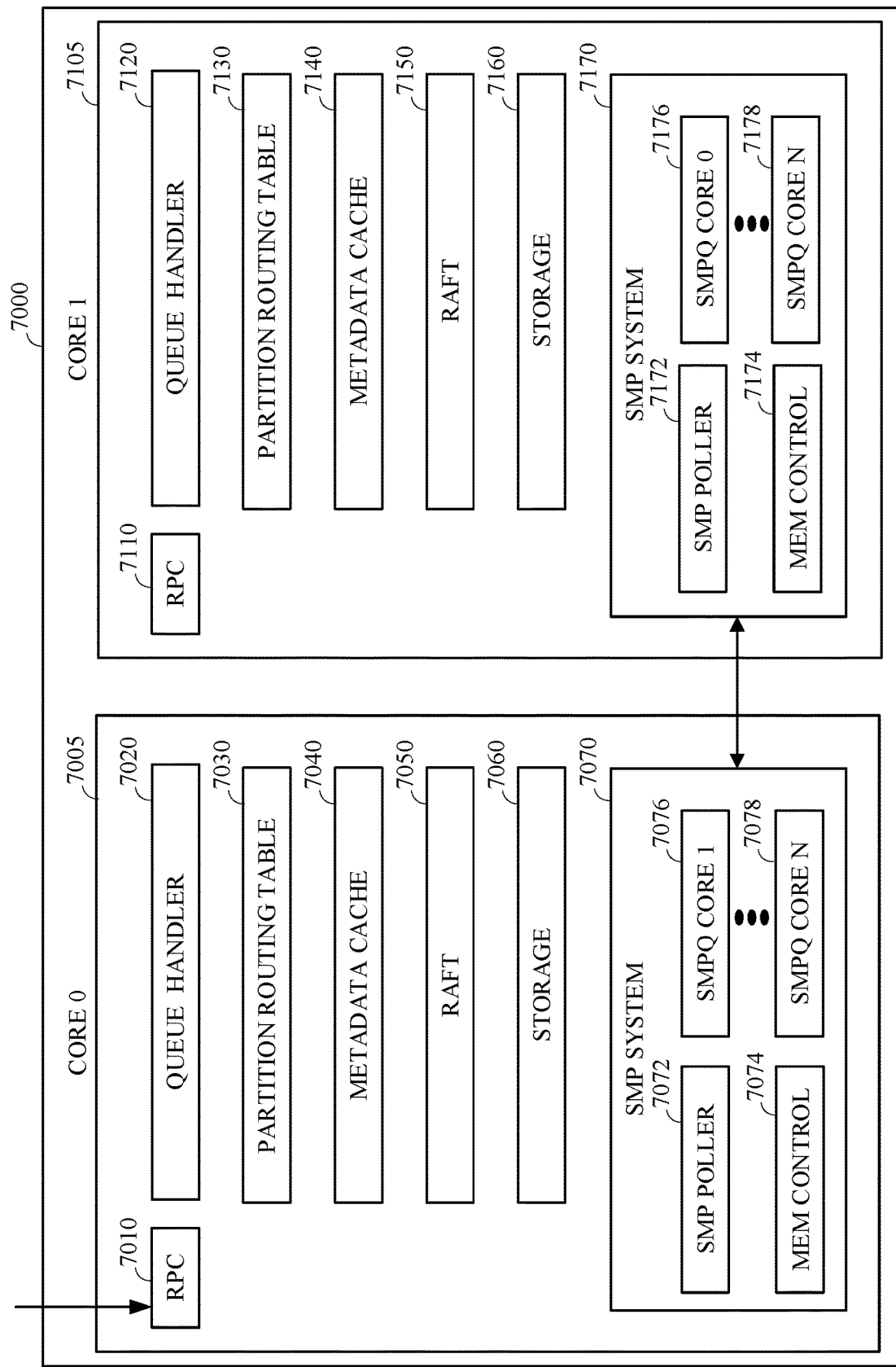
FIG. 7 is a block diagram of an example of components associated with a portion of a queuing system.

FIG. 7 is a block diagram of an example of components associated with a portion of a queuing system, such as queueing system 5050. FIG. 7 includes an example server computing device 7000 having core 0 7005 and core 1 7105. Only two cores are pictured for ease of explanation, however in a typical implementation, there will be additional cores. Core 0 7005 and core 1 7105 each have a number of associated components, which may be implemented by instructions that are executed by a respective processing thread for each of the respective cores. In the implementation shown, each core has a single processing thread that is "pinned" for execution by that particular core.

Generally speaking, the processing threads of the cores may be implemented such that each are made up of or utilize processing units configured in the same or a similar way, although there may be exceptions such as those described below. The cores have respective RPC units 7010, 7110. The RPC (remote procedure call) unit handles communications received by an electronic communication unit. Generally speaking, a single core may be designated to receive all of the communications received by the server computing device 7000, in which case only one of the RPC units 7010, 7110 may be actively utilized. Depending on the operating system, it may not be possible to designate which core receives communications via the electronics communication unit, so the processing thread for each core may be configured such that any core is able to handle such communications.

The RPC units 7010, 7110 may handle the generation of "iobuf" data structures upon the receipt of a queue batch containing queue requests, such as described above with respect to FIG. 6. While this disclosure generally refers to a queue batch and queue request as describing the enqueuing or production of data on or to a queue in the queueing system, a queue batch and queue request may also include a request to dequeue or consume data on a queue or to provide administrative commands or functions to the queueing system. When queue requests are transmitted to a different computing device according to the fault tolerance protocol (e.g., raft), the RPC units 7010, 7110 (one or both, as the case may be) may also receive such requests as well.

Figure 8:
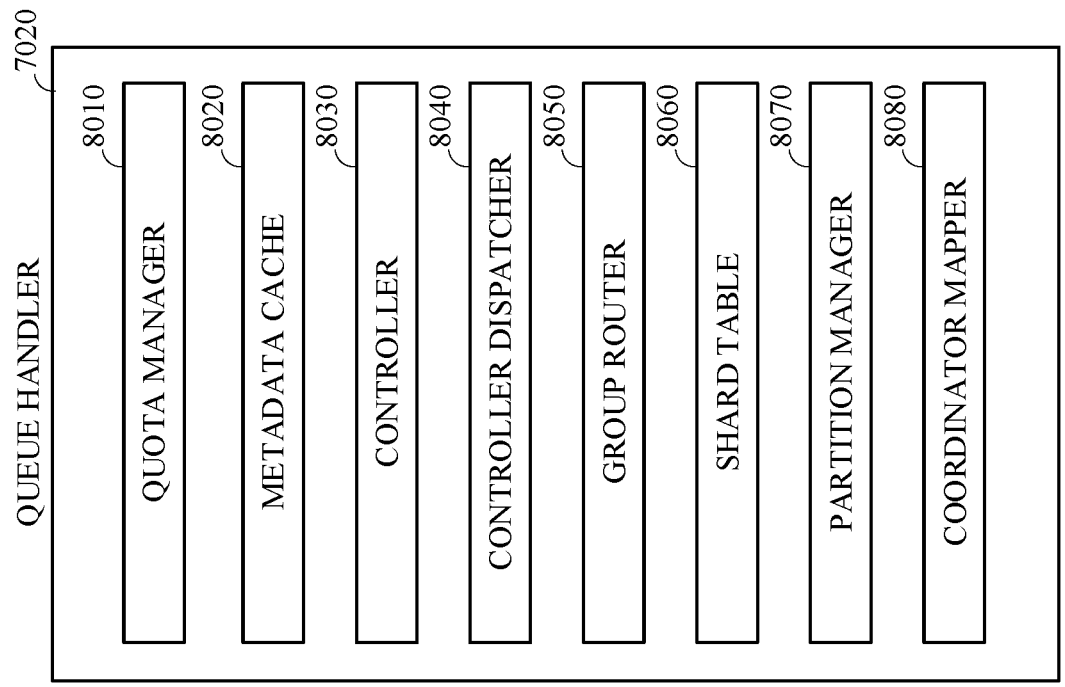
FIG. 8 is a block diagram of an example of components of a queue handler.

A queue handler 7020, 7120 may be configured to handle the processing of queue requests, for example, utilizing the units and processes described in further detail with respect to FIG. 8. The queue handler 7020, 7120 may be configured to utilize a partition routing table 7030, 7130; a metadata cache 7040, 7140; raft 7050, 7150; a storage 7060, 7160; and/or a SMP system 7070, 7170 to properly process requests.

Partition routing table 7030, 7130 provides a cache stored locally for each core that indicates which core(s) are designated to process which partition(s). For example, as previously described earlier, a queue request may concern a topic which may be segmented into multiple partitions which each process a subset of the queue requests for that topic. The partition routing table 7030, 7130 may be utilized to look up a partition identifier to determine, for example, whether a queue request is to be processed using the core on which the queue request is received or a different core. If the queue request is to be processed using a different core, a structured message will be sent to that different core using the SMP system 7070, 7170 and the queue request will not generally be further processed on the receiving core (e.g., by the queue handler 7020, 7120).

The metadata cache 7040, 7140 provides a list of valid topics for each partition that can be utilized by, for example, the queue handler 7020, 7120 to verify that the queue request includes a valid topic for the partition. The metadata cache 7040, 7140 stores the list local to each core in order to avoid memory locks and to store the data in a physically proximate manner to the core in order to reduce latency for checking the metadata cache, since it may be checked for each queue request.

Raft 7050, 7150 is the unit that handles the fault tolerant protocol for the queuing system. For example, raft may be used which is a mathematically proven fault tolerant protocol. This means that raft has a mathematical proof indicating that the protocol is fault tolerant—e.g., it is proven that there will be no data loss of received queue requests so long as the protocol is followed.

Raft 7050, 7150 may be members of the so-called management raft group (also referred to as "raft0"). The management raft group is responsible for assigning raft groups (each of which may represent a partition of a topic, depending on the implementation) to various computing devices and a core of the respective computing devices. For example, a first partition may be assigned to core 0 7005 and a second partition may be assigned to core 1 7105. For example, for each raft group, raft0 may include a variable indicating a number of computing devices included in the raft group and the IP addresses of each of the computing devices included in the raft group.

When a partition is assigned to a computing device, a single core on that computing device may be assigned to process queue requests assigned to that partition. Each raft group elects a leader and the remaining members of the raft group are followers, as further described in the previously referenced documentation relating to the raft protocol. Generally, the leader of the raft group will process queue requests for a given raft group and will coordinate synchronization (e.g., replication) of the processed queue requests to other members of the raft group. For example, a message may be sent to the other computing device members of the raft group with the information to be replicated. The message may be received, for example, by a RPC unit of the target computing device(s) and then be handled using a queue handler and/or raft unit of the receiving core(s) of the target computing device(s).

When a new topic and/or new partition is created or a queue request is received with a new topic and/or new partition, raft 7050, 7150 may operate to create a new raft group representative of the new partition and computing devices and cores may be assigned to the new raft group and reflected in the management raft group. The assignment of partitions to raft groups is advantageously stored in the management raft group, to which all computing devices and cores may be a member, so that when a queue request is received by a core, the information relating to the assignment of the queue request is available locally (and thus, the assignment for processing may be determined without accessing memory of a different core or making a network request for the information on a queue request by queue request basis).

Raft 7050, 7150 may also operate to enable reading or consumption of data previously processed by the queuing system and stored, e.g., in the storage 7060, 7160. For example, consumer groups can be created to consume data stored across multiple partitions/raft groups. The resulting read requests may be distributed amongst the various raft groups for processing. The raft group leader from each raft group can be configured to handle such requests, including making an indicating that a particular piece of data (key value pair) has been read.

The storage 7060, 7160 may be used by raft 7050, 7150 to store data received via processed queue requests. For example, the storage 7060, 7160 may take the form of a log of key value pairs. For example, the storage logs described with respect to the raft documentation may be utilized. The storage 7060, 7160 may also be used to reflect when the various items in the log have been read.

The SMP (structured message passing) system 7070, 7170 is used to pass structured messages between the cores of a computing device. Repsective SMP system 7070, 7170 includes a SMP poller 7072, 7172 and a memory control 7074, 7174 along with various structured message passing queues (SMPQ) for other cores, such as SMPQ core 1 7076 and SMPQ core N 7078 for core 0 7005 and SMPQ core 0 7176 and SMPQ core N 7178 for core 1 7105. In the illustrated example, 'N' reflects the possible number of cores, in which case the illustrated elements of FIG. 4 would be extended to reflect the number of cores according to the number implemented.

The SMP poller 7072, 7172 operates to periodically poll the SMP queues of other cores that are assigned to the core of the SMP poller 7072, 7172. In the illustrated example, the SMP poller 7072 will poll SMPQ core 0 7176 and SMPQ core N 7178 and the SMP poller 7172 will poll SMPQ core 1 7076 and SMPQ core N 7078. The SMP system 7070, 7170 does not have a SMPQ assigned to its own core because it is not necessary for a core to pass structured messages to itself. The memory control 7074 determines the memory chunks associated with structured messages sent and received using the SMP system 7070, 7170. For example, when a structured message is sent from the SMP system 7070 to the SMP system 7170 using SMPQ core 1 7076 and the SMP poller 7172 to process a queue request present in one or more memory chunks allocated to core 0 7005, the mem control 7074 may be configured to determine the memory chunks in which the queue request is stored and increment the reference counters associated with those memory chunks.

Correspondingly, the memory control 7074 may be configured to, responsive to a message obtained by the SMP poller 7072 from SMPQ core 0 7176 that core 1 7105 has processed the queue request, decrement the reference counters associated with the respective memory chunks. This process may be repeated multiple times for various memory chunks depending on how many queue requests (or portions thereof) are stored in each memory chunk. By doing so, the SMP system 7070 is able to track which of the memory chunks allocated to core 0 7005 are still in use. The memory control 7074 may be further configured to utilize this information by, responsive to the decrementing of a reference count to zero, cause the deallocation of the memory associated with that memory chunk.

FIG. 8 is a block diagram of an example of components of a queue handler 7020. The queue handler 7020 may include a quota manager 8010, a metadata cache 8020, controller 8030, a controller dispatcher 8040, a group router 8050, a shard table 8060, a partition manager 8070, and a coordination mapper 8080. Additional or fewer components may be utilized depending on the implementation and requirements of the implemented queuing system. In certain implementations, the components of the queue handler 7020 may be implemented in a manner consistent with what is permitted or required in the protocols promulgated by Apache Kafka.

The quota manager 8010 may operate to control the bandwidth utilized by the queue handler 7020 and by extension the queuing system which uses the queue handler 7020. For example, the quota manager 8010 may operate to control bandwidth by throttling the receipt of and/or processing of queue batches or queue requests so as to keep the receipt or processing rate of queue batches or queue request within a desired value.

The metadata cache 8020 operates to assign the processing of partitions to computing devices, utilizing the cache stored in the metadata cache 7040, 7140. For example, if a queue request is set to the queue handler 7020 for processing and the queue request is not assigned to the computing device on which queue handler is executing, the metadata cache 8020 may return an error. The metadata cache 8020 may operate to periodically update the metadata cache 7040, 7140 to reflect updated partition to computer assignments in coordination and communication with raft 7050, 7150.

The controller 8030 operates to handle administrative requests, e.g., other than write requests. For example, the controller 8030 may be configured to handle requests to create or delete partitions or topics, or perform other administrative type requests, such as those found in implementations of Apache Kafka. In some implementations, the controller 8030 is only found in core 0 of a computing device and any such requests required to be processed by the controller 8030 are routed to core 0. Alternatively, the controller 8030 may be assigned to another arbitrary core and requests to be processed by the controller 8030 may be routed to that arbitrary core.

The controller dispatcher 8040 operates to transmit administrative messages to other computing devices in the queuing system responsive to requests handled by the controller 8030. For example, the controller dispatcher 8040 may transmit messages to other computing devices indicating that a partition has been created or deleted and providing information sufficient to update partition routing tables and metadata caches accordingly. As with the controller 8030, the controller dispatcher 8040 may be implemented on only one core of a computing device.

The group router 8050 operates to determine the raft group associated with a queue request by taking as input the topic and partition of the queue request and determining the associated raft group, e.g., by consulting the partition routing table and metadata cache stored locally with the associated core.

The shard table 8060 operates to store and determine which core owns each raft group. The shard table 8060 may be implemented in a manner to randomly, equally, or in some other manner distribute the processing of and leadership of the various raft groups assigned to a computing device to the various cores of the computing device. This process may be undertaken locally to a computing device, as the core assigned to a particular raft group may be different on the various computing devices that comprise a raft group.

The partition manager 8070 operates to manage the consumption of data queued in the queuing system. For example, a consumer group covering the partitions associated with a topic can be created to permit the coordinated consumption of the data in all the partitions associated with a topic. The consumer group may be assigned to a computing device to coordinate the consumption of data associated with all of the partitions in the consumer group. When a request to read data is received, the partition manager 8070 may determine whether the computing device on which it is executing is responsible for coordinating the read request. If so, control is passed to the coordination mapper 8080 to process the read request. Otherwise, a response is returned indicating which computing device has control over such read requests. In this way, the partition manager 8070 may operate to load balance read requests across the computing devices of the queueing system.

The coordination mapper 8080 controls the reading of data and transmission of data to clients by retrieving data from the partitions that make up the consumer group to which a read request is associated and transmitting the retrieved data to the client to which the read request originates.

Figure 9:
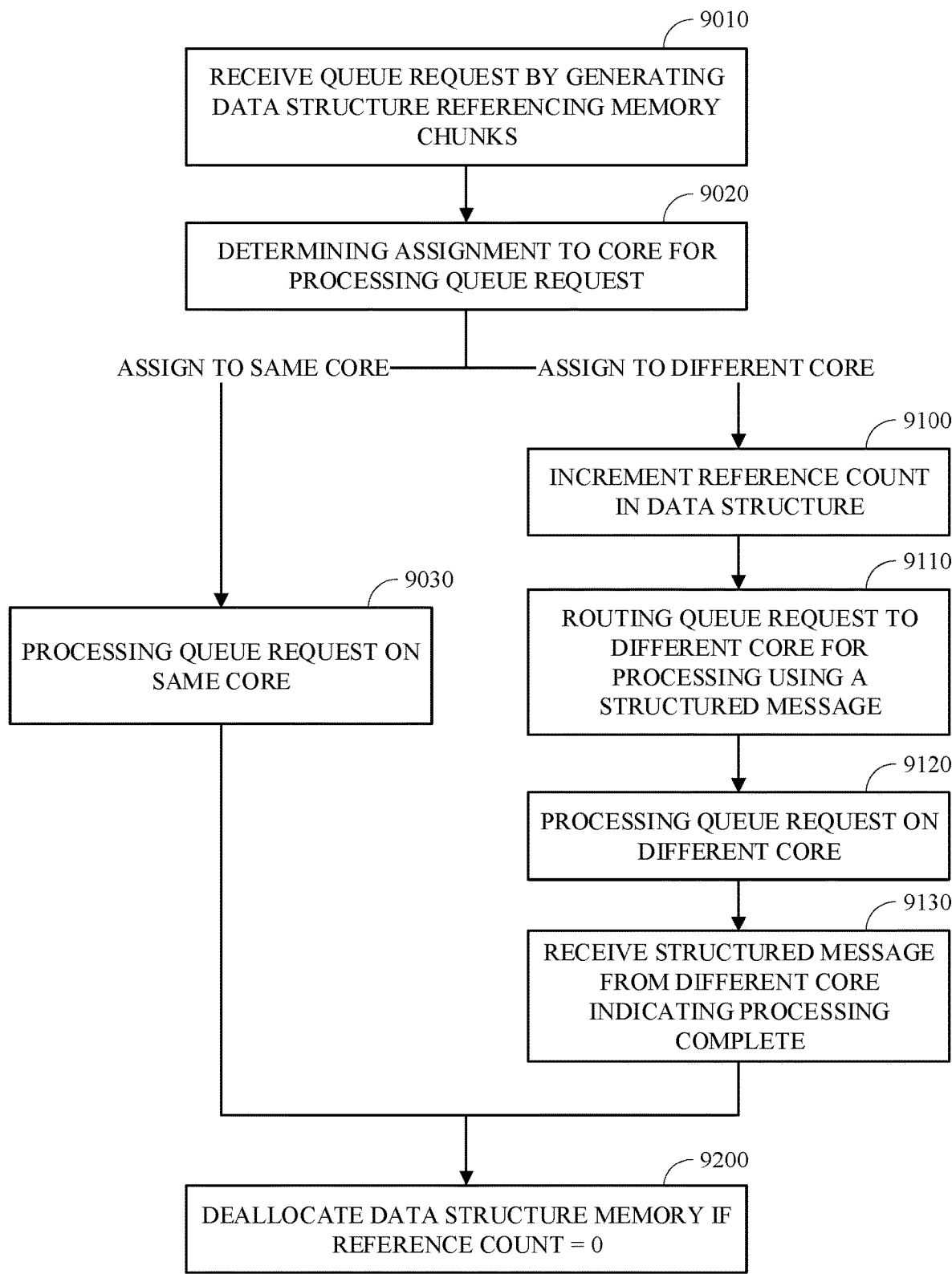
FIG. 9 is a diagram of an example of operations associated with processing a queue request received by a computing device of a queuing system.

FIG. 9 is a diagram of an example of operations associated with processing a queue request received by a computing device of a queuing system. For example, the steps of FIG. 9 may be performed by a computing device in a queuing system (see, e.g., 1000 of FIG. 1, 3100 of FIG. 3, 7000 of FIG. 7). More specifically, certain steps of FIG. 9 may be processed by one or more specified cores of the computing device. For example, steps 9010, 9020, 9030, 9100, 9110, 9130, and 9200 may be performed on a first core, and step 9120 may be performed on a second core. For example, steps to be performed by a core may be performed by a processing thread associated with (e.g., pinned to) that core, and the processing thread may execute instructions stored in memory that are designed to effectuate the steps described herein.

In step 9010, a queue request is received. For example, an electronic communications unit may receive a queue batch which includes a queue request. The electronic communications unit may allocate a number of chunks of memory in which the queue batch and/or queue request is stored. As a part of step 9010, a data structure may be generated referencing the memory chunks. For example, an "iobuf" data structure consistent with the description relating to the batch of data 6300 and FIG. 6 may be generated.

In step 9020, an assignment of the queue request to a core of the computing device for processing is determined. For example, this determination may be made in a manner consistent with the description relating to FIG. 7, FIG. 8, and shard table 8060. For example, the queue request may be assigned to the same core or a different core than the core used to receive the queue request and determine the queue request assignment. For example, a comparison may be made between a topic and/or partition identifier included in the queue request against a partition routing table (e.g., the partition routing table 7030, 7130) to determine what core is assigned to the queue request. The comparison against the partition routing table may also include utilizing shard table 8060 as previously described.

If the queue request is assigned to the same core, that core may then process the queue request in step 9030. If the queue request is assigned to a different core, the queue request is processed by the different core by way of steps 9100-9130.

In step 9100, the reference counts in the data structure associated with the memory chunks in which the queue request are stored are incremented. For example, this may be done in a manner consistent with that described with respect to FIG. 6 and the SMP system 7070, 7170.

In step 9110, the queue request is routed to a different core for processing using a structured message. For example, this may be done in a manner consistent with that described with respect to the SMP system 7070, 7170. For example, a structured message may be generated referencing the queue request in the data structure, and the structured message may be placed in a structured message passing queue for the different core thus enabling the transmission of the queue request to the different core.

In step 9120, the queue request may be processed by the different core. For example, the different core may poll the structured message queue created by the first core for the different core, and responsive to receiving the structured message referencing the queue request, the different core may read the queue request stored in the data structure and process it. For example, where core 1 7105 is the different core, the SMP poller 7172 as described with respect to FIG. 7 may be utilized. Once the processing is completed, the different core may route a structured message to the same core indicating that processing is complete, for example by storing a structured message in a structured message passing queue for the same core.

In step 9130, the structured message indicating that the queue request has been processed is received by the same core from the different core. Responsive to receiving the message, the reference counts for the respective memory chunks storing the queue request are decremented. For example, this may be done in a manner consistent with that described with respect to the SMP system 7070, 7170.

In step 9200, the data structure memory chunks are deallocated if their respective reference counts are equal to zero, which is an indication that the processing of data stored in the memory chunks has been completed. For example, if the memory chunks only store one queue request and the queue request was the subject of only one structured message for processing, the reference count was incremented in step 9100 and decremented in step 9130, so the reference count would be equal to zero, resulting in deallocation of the memory. If, by contrast, the one or more of the memory chunks store multiple queue requests, the deallocation of such memory chunks will be delayed until such time that all the processing of associated queue requests (as tracked by the reference count) is completed.

Figure 10:
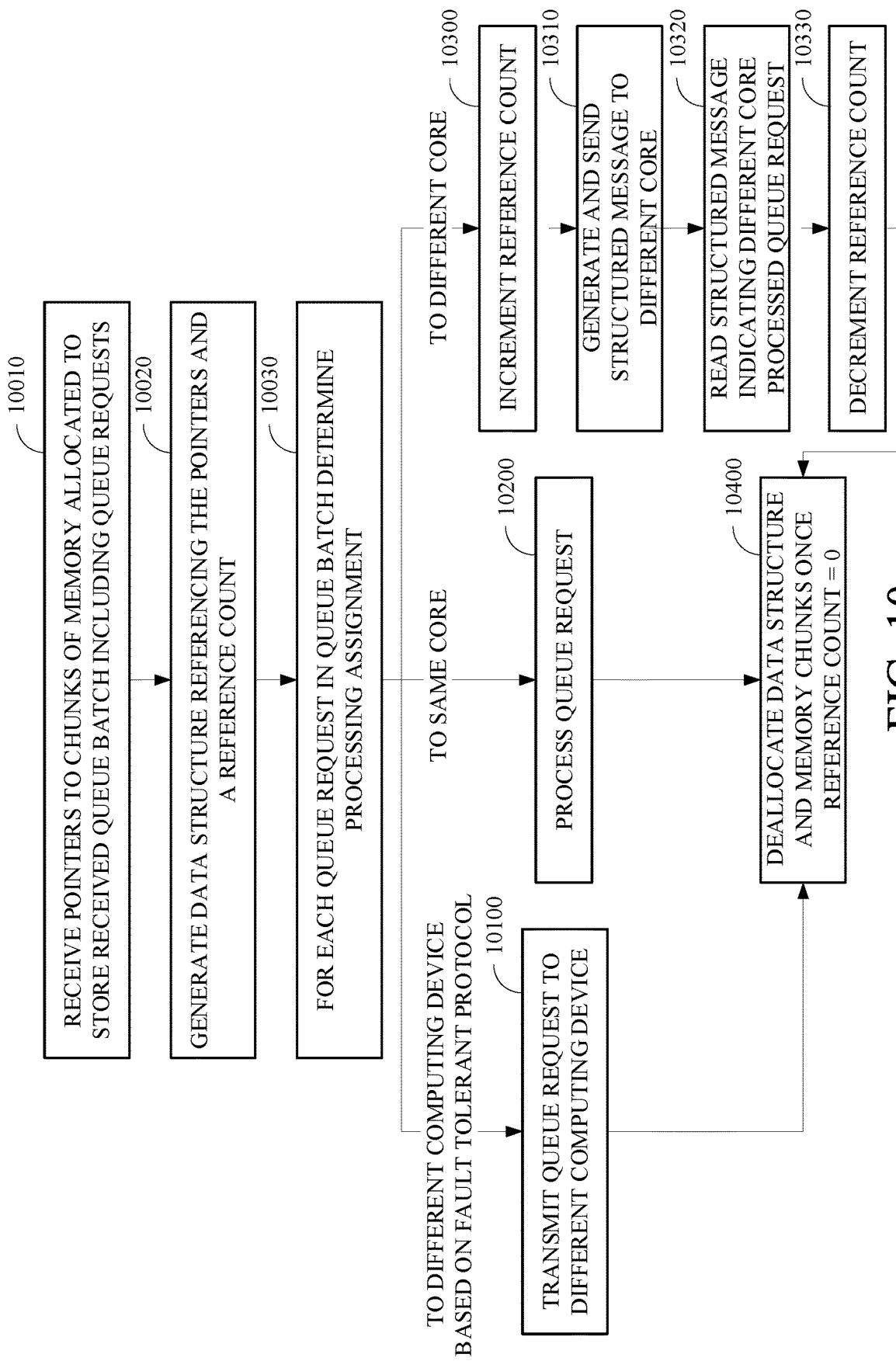
FIG. 10 is a diagram of an example of operations associated with a queue batch received by a computing device of a queuing system.

FIG. 10 is a diagram of an example of operations associated with a queue batch received by a computing device of a queuing system. For example, the steps of FIG. 10 may be performed by one or more computing device in a queuing system (see, e.g., 1000 of FIG. 1, 3100-3500 of FIG. 3, 7000 of FIG. 7). More specifically, certain steps of FIG. 10 may be processed by one or more specified cores of a computing device. For example, steps to be performed by a core may be performed by a processing thread associated with (e.g., pinned to) that core, and the processing thread may execute instructions stored in memory that are designed to effectuate the steps described herein.

In step 10010, pointers to chunks of memory allocated to a queue batch are received. For example, an electronic communications unit may receive a queue batch which includes a queue request. The electronic communications unit may allocate a number of chunks of memory in which the queue batch and/or queue request is stored.

In step 10020, a data structure may be generated referencing the memory chunks. For example, an "iobuf" data structure consistent with the description relating to the batch of data 6300 and FIG. 6 may be generated. The data structure may include a pointer to and a reference count for each of the chunks of memory so as to enable memory management of the memory chunks.

In step 10030, assignments of the queue requests in the queue batch to respective core(s) of the computing device or to a different computing device for processing is determined. For example, this determination may be made in a manner consistent with the description relating to FIG. 7, FIG. 8, and the shard table 8060. For example, a queue request may be assigned to the same core or a different core than the core used to receive the queue batch and determine the queue request assignment. For example, a comparison may be made between a topic and/or partition identifier included in the queue request against a partition routing table (e.g., the partition routing table 7030, 7130) to determine what core is assigned to the queue request. The comparison against the partition routing table may also include utilizing the shard table 8060 as previously described.

If a queue request is to be processed by a different computing device, the queue request may be transmitted to the different computing device in step 10100. For example, this may be done in a manner consistent with that described with respect to raft 7050, 7150 as illustrated with respect to FIG. 7. If a queue request is assigned to the same core, that core may then process the queue request in step 10200. If a queue request is assigned to a different core, the queue request is processed by the different core by way of steps 10300-10330.

In step 10300, the reference counts in the data structure associated with the memory chunks in which the queue request are stored are incremented. For example, this may be done in a manner consistent with that described with respect to FIG. 6 and the SMP system 7070, 7170.

In step 10310, the queue request is routed to a different core for processing using a structured message. For example, this may be done in a manner consistent with that described with respect to the SMP system 7070, 7170. For example, a structured message may be generated referencing the queue request in the data structure, and the structured message may be placed in a structured message passing queue for the different core.

In step 10320, the structured message indicating that the queue request has been processed is received by the same core from the different core. For example, the different core may send such a structured message after processing the queue request. For example, the different core may poll the structured message queue created by the first core for the different core, and responsive to receiving the structured message referencing the queue request, the different core may read the queue request stored in the data structure and process it. For example, where core 1 7105 is the different core, the SMP poller 7172 as described with respect to FIG. 7 may be utilized. Once the processing is completed, the different core may route a structured message to the same core indicating that processing is complete, for example by storing a structured message in a structured message passing queue for the same core. For example, this may be done in a manner consistent with that described with respect to the SMP system 7070, 7170.

In step 10330, the reference counts for the respective memory chunks storing the queue request are decremented.

In step 10400, the data structure memory chunks are deallocated once their respective reference counts are equal to zero. For example, if a memory chunk only stores one queue request and the queue request was the subject of only one structured message for processing, the reference count was incremented in step 10300 and decremented in step 10330, so the reference count would be equal to zero, resulting in deallocation of the memory. If, by contrast, the one or more of the memory chunks store multiple queue requests, the deallocation of such memory chunks will be delayed until such time that all the processing of associated queue requests (as tracked by the reference count) is completed.

The present disclosure is not to be limited in terms of the specific embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The arrangements shown in the figures should not be viewed as limiting. Other embodiments can include more or less of each element shown in a given figure. Further, some of the illustrated elements can be combined or omitted. Yet further, an example embodiment can include elements that are not illustrated in the figures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing queue requests by a queuing system having a plurality of computing devices, each computing device having a plurality of cores, each core having an associated processing thread configured to receive queue requests, the method comprising:

receiving a first queue request by a processing thread associated with a first core of a first computing device of the plurality of computing devices, wherein receiving the first queue request includes generating a data structure for storing the first queue request, where the data structure references memory chunks generated by an electronic communication unit;

determining an assignment of the first queue request to a second core of the first computing device based on a comparison between an identifier associated with the first queue request in the data structure and a partition routing table stored in a memory location associated with the first core;

routing the first queue request to the second core by generating a first structured message that includes a pointer referencing memory associated with the data structure that stores the first queue request and by storing the first structured message in a structured message passing queue for the second core, wherein the second core processes the first queue request stored in the data structure responsive to reading the structured message; and deallocating the data structure responsive to an indication that processing of data stored in the data structure has been completed.

2. The method of claim 1, wherein the first queue request is included in a queue batch that includes a plurality of queue requests, the data structure stores the plurality of queue requests, and the determining and routing steps are performed for each of the plurality of the queue requests.

3. The method of claim 2, wherein routing the first queue request includes, for each structured message passed to another core associated with a given queue request, incrementing a reference count for each memory chunk associated with the given queue request.

4. The method of claim 1, further comprising:
receiving a second queue request by the processing thread;
determining an assignment of the second queue request to the first core of the first computing device based on a comparison between an identifier associated with the second queue request in the data structure and the partition routing table; and
processing, using the first core, the second queue request.

5. The method of claim 1, further comprising:
determining a second computing device to transmit the first queue request to using a mathematically proven fault tolerant protocol; and
transmitting the first queue request to the second computing device.

6. The method of claim 5, wherein the mathematically proven fault tolerant protocol is raft.

7. The method of claim 1, further comprising:
reading, using the first core, a second structured message from the second core that includes the indication that processing of data stored in the data structure has been completed.

8. A method for processing network traffic by a queuing system having a plurality of computing devices, each computing device having a plurality of cores, each core having an associated processing thread configured to receive network traffic, the method comprising:
receiving, by a first processing thread associated with a first core of the plurality of cores of a first computing device of the plurality of computing devices, pointers to chunks of memory allocated responsive to a receipt of network traffic by an electronic communications unit, the chunks of memory each including a portion of a queue batch transmitted to the first computing device, wherein the queue batch includes a plurality of queue requests;

generating a data structure including the pointers and a reference count;
determining, for a first queue request of the plurality of queue requests, a processing assignment to a second core of the plurality of cores of the first computing device;
generating a first structured message for the first queue request; and
storing the first structured message in a structured message passing queue associated with the second core, wherein a second processing thread associated with the second core, responsive to receiving the structured message, processes the first queue request by retrieving the first queue request from at least one of the chunks of memory.

9. The method of claim 8, further comprising:
incrementing a reference count associated with a first chunk of memory that stores at least a portion of the first queue request;
reading a second structured message from the second core indicating that the first queue request was processed by the second core; and
decrementing the reference count responsive to reading the second structured message.

10. The method of claim 9, further comprising:
responsive to a determination that the reference count equals zero, deallocating the first chunk of memory associated with the reference count.

11. The method of claim 8, wherein processing the first queue request includes storing information from the first queue request in a queue.

12. The method of claim 8, further comprising:
determining that a second queue request of the plurality of queue requests is to be processed by a second computing device of the plurality of computing devices using a mathematically proven fault tolerant protocol; and
transmitting the second queue request to the second computing device.

13. The method of claim 12, wherein the mathematically proven fault tolerant protocol is raft, the second computing device is a leader of a raft group, the first computing device is a follower of the raft group, and the method further comprises:
receiving, by the first computing device, a message from the second computing device to synchronize information from the second queue request to a queue stored on the first computing device.

14. An apparatus comprising:
a memory; and
a processor having a first core and a second core, the first core configured to execute instructions stored in the memory to:
receive pointers to chunks of memory allocated in the memory responsive to a receipt of network traffic by an electronic communications unit, the chunks of memory each including a portion of a queue batch transmitted to the electronic communications unit, wherein the queue batch includes a plurality of queue requests;
generate a data structure including the pointers and a reference count;
determine, for a first queue request of the plurality of queue requests, a processing assignment to the second core;
generate a first structured message for the first queue request; and store the first structured message in a structured message passing queue in the memory, wherein the second core, responsive to reading the first structured message, processes the first queue request by retrieving the first queue request from at least one of the chunks of memory.

15. The apparatus of claim 14, wherein the first core is further configured to execute instructions stored in the memory to:
   increment a reference count associated with a first chunk of memory that stores at least a portion of the first queue request;
   read a second structured message from the second core indicating that the first queue request was processed by the second core; and
   decrement the reference count responsive to the second structured message.

16. The apparatus of claim 15, wherein the first core is further configured to execute instructions stored in the memory to:
   responsive to a determination that the reference count equals zero, deallocate the chunk of memory associated with the reference count.

17. The apparatus of claim 14, wherein the second core processes the first queue request including by executing instructions to store information from the first queue request in a queue.

18. The apparatus of claim 14, wherein the processor and memory are housed in a first computing device and the processor is further configured to execute instructions stored in the memory to:
   determine that a second queue request of the plurality of queue requests is to be processed by a second computing device using a mathematically proven fault tolerant protocol; and
   transmit the second queue request to the second computing device.

19. The apparatus of claim 18, wherein the mathematically proven fault tolerant protocol is raft, the second computing device is a leader of a raft group, the first computing device is a follower of the raft group, and the processor is further configured to execute instructions stored in the memory to:
   receive a message from the second computing device to synchronize information from the second queue request to a queue stored in the memory.

20. The apparatus of claim 14, where the data structure includes each of the received pointers.

* * * * *